Patented June 26, 1951

2,557,931

UNITED STATES PATENT OFFICE 2,557,931

PHENYLENE LINKED ORGANOPOLYSILANES

Arthur J. Barry, Midland, Mich., assignor to Dow Corning Corporation, Midland, Mich., a corporation of Michigan No Drawing. Application February 3, 1950, Serial No. 142,340

7 Claims. (Cl. 260—448.2)

This invention relates to the production of organopolysilicon halides in which the silicon atoms are linked by phenylene radicals.

It is shown in my copending application Serial No. 114,286, filed jointly with DePree and Hook, that a polyhalo aromatic hydrocarbon may be reacted with a monohydrochlorosilane to produce chlorosilyl benzenes.

It is also shown in my copending applications Serial Nos. 55,021 and 55,023 that the boron halide catalyzed reactions of benzene with trichlorosilane or methyldichlorosilane give the corresponding bischlorosilyl benzenes as by-products. These reactions, however, produce compartively minor amounts of these phenylene linked compounds.

It is an object of this invention to provide improved methods for producing phenylene linked chlorosilanes. It is a further object of my invention to increase the effective functionality of highly substituted phenylchlorosilanes such as diphenylmethylchlorosilane and dimethylphenylchlorosilane, thus converting these compounds into new compounds with higher Cl:Si atomic ratios and making them more useful for the production of organosilicon resins.

Other objects and advantages will be apparent from the following description.

In accordance with a preferred form of the present invention, an organochlorosilane which contains at least one phenyl radical and at least one chlorine atom bonded directly to the same silicon atom is reacted with a chlorohydrosilane. The reaction is conducted at a temperature above 150° C., in the presence of a boron halide, and at a pressure sufficient that at least some of the reaction mixture is in a liquid phase.

The organohalosilanes employed in the practice of this invention have the general formula $C_6H_5R_xSiCl_{3-x}$, in which each R represents a monovalent hydrocarbon radical free of aliphatic unsaturation, and $x$ is an integer having a value of from 0 to 2 inclusive. Examples of preferred organochlorosilanes include phenyltrichlorosilane, $C_6H_5SiCl_3$; diphenyldichlorosilane, $(C_6H_5)_2SiCl_2$ triphenylchlorosilane, $(C_6H_5)_3SiCl$; methylphenyldichlorosilane, $CH_3(C_6H_5)SiCl_2$; methyldiphenylchlorosilane, $CH_3(C_6H_5)_2SiCl$; and dimethylphenyl chlorosilane, $(CH_3)_2C_6H_5SiCl$. All of these compounds may be prepared by the conventional reaction of the appropriate Grignard reagents with tetrachlorosilane.

The chlorohydrosilanes employed in the practice of my invention have the general formula $R'_nHSiCl_{3-n}$, in which R' represents a radical of the group consisting of methyl and phenyl radicals, and $n$ is an integer of from 0 to 1. The preferred chlorohydrosilanes are trichlorosilane and methyldichlorosilane.

The preferred boron halide is boron trichloride. It is generally employed in the proportion of between 0.10 per cent and 5.0 per cent, based on the total weights of the reactants.

The reaction may be conducted at a temperature of from 150° C. to 420° C., the preferred range being from 180° C. to 350° C. The pressure should be such that at the temperature of operation at least some of the reaction mixture is in a liquid phase. This may be accomplished in various ways, such as by introducing the reactants continuously into the reaction zone under pressure, or by operating under autogenous pressure in a closed system.

The ratios of the reactants of this invention are not critical, and may be varied according to the amount of phenylene linked material desired in the reaction product. However, based on economics and the law of mass action, it is preferable to have less than 20 mols of either of the reactants per mol of the other reactant.

In the reaction between the organochlorosilane and the chlorohydrosilane, a hydrogen atom in the phenyl radical of the former is replaced by a chlorosilyl radical, the silicon atom of the latter being bonded directly to the benzene ring of the former. Thus, the product contains at least two silicon atoms which are linked to each other by a phenylene radical. The following equations are representative of the reaction. For simplicity, the symbols Me and Ph are used to designate methyl and phenyl radicals respectively.

1. $PhSiCl_3 + HSiCl_3 \rightarrow Cl_3Si \cdot C_6H_4 \cdot SiCl_3 + H_2$

2. $Cl_3Si \cdot C_6H_4 \cdot SiCl_3 + HSiCl_3 \rightleftharpoons$
$SiCl_4 + Cl_3Si \cdot C_6H_4 \cdot SiHCl_2$
$PhSiCl_3 + Cl_3Si \cdot C_6H_4 \cdot SiHCl_2 \rightarrow$
$Cl_3Si \cdot C_6H_4 \cdot SiCl_2 \cdot C_6H_4 \cdot SiCl_3$ 3. $PhSiCl_3 + MeHSiCl_2 \rightarrow MeCl_2Si \cdot C_6H_4 \cdot SiCl_3 + H_2$ 4. $Ph_2SiCl_2 + MeHSiCl_2 \rightarrow$
$PhCl_2Si \cdot C_6H_4 \cdot SiCl_2Me + H_2$ 5. $MePh_2SiCl + MeHSiCl_2 \rightarrow$
$PhMeClSi \cdot C_6H_4 \cdot SiCl_2Me + H_2$ 6. $MePh_2SiCl + HSiCl_3 \rightarrow$
$PhMeClSi \cdot C_6H_4 \cdot SiCl_3 + H_2$ 7. $PhSiCl_3 + PhHSiCl_2 \rightarrow PhCl_2Si \cdot C_6H_4 \cdot SiCl_3 + H_2$ The products of this invention are useful as intermediates in the preparation of organosilicon resins, which find great utility in electrical insulating varnishes and protective coating enamels.

The following examples describe specific embodiments of the invention but are not to be construed as limiting the scope thereof.

*Example 1*

A mixture of 3810 grams of phenyltrichlorosilane, 2440 grams of trichlorosilane, and 64 grams of boron chloride was heated for 16 hours in an autoclave of 14.4 liter capacity at a temperature in the range of from 290° C. to 310° C. The maximum pressure attained within the autoclave was 740 pounds per square inch. The autoclave was then cooled and the contents discharged and distilled.

There were obtained 617 grams of bis(trichlorosilyl)benzene, 356 grams of $C_6H_5Cl_2Si \cdot C_6H_4 \cdot SiCl_3$ 73 grams of bis(trichlorosilylphenyl)dichlorosilane and 257 grams of organosilicon halides disstilling above 212° C. at 5 mm. absolute pressure. 1512 grams of phenyltrichlorosilane were recovered.

Two isomeric bis(trichlorosilyl)benzenes were obtained. One was a white crystalline material of triclinic structure, having a boiling point of 168° C. at 30 mm. pressure and was identified as the para isomer. The other was a liquid which boiled at 160° C. at 30 mm., having a specific gravity of 1.497 at 20° C., and was identified as the meta isomer.

The $C_6H_5Cl_2Si \cdot C_6H_4 \cdot SiCl_3$ is a liquid having a specific gravity of 1.386 and a boiling point of 226° C. at 30 mm. pressure.

The bis(trichlorosilylphenyl)dichlorosilane, $Cl_3SiC_6H_4 \cdot SiCl_2 \cdot C_6H_4SiCl_3$ which was obtained was a liquid which had a boiling point of 211 to 212° C. at 5 mm. pressure, and a specific gravity of 1.490 at 20° C.

*Example 2*

A 4.5 liter autoclave was charged with 900 g. of a crude mixture of $MePhSiCl_2$, $Me_2PhSiCl$, $Ph_2SiCl_2$, $Ph_2MeSiCl$, and $Ph_3SiCl$. This mixture had an analysis of 17.4% Cl, 12.5% Si, giving a Cl:Si atomic ratio of 1.1. To this crude mixture was added 600 g. of methyldichlorosilane and 7.5 g. of boron trichloride. The autoclave was then closed and heated for 20 hours at 190° C.–200° C. The maximum pressure developed during the heating period was 350 pounds per square inch. The autoclave was cooled, the contents were discharge, and boron trichloride and unreacted methyldichlorosilane were distilled therefrom. The reaction product had an analysis of 30.14% Cl, 14.84% Si, showing that the Cl:Si atomic ratio had been increased to 1.6. This reaction product contained polymeric chlorosilanes in which the silicon atoms were linked to one another by phenylene radicals.

*Example 3*

In the manner of Example 2, 900 g. of the aforesaid crude mixture was heated for 20 hours at a temperature of from 195° C. to 200° C. with 600 g. of methyldichlorosilane and 15 g. of boron trichloride. After distilling off boron trichloride and unreacted methyldichlorosilane, the reaction product was found to have an analysis of 31.65% Cl and 14.83% Si, showing a Cl:Si atomic ratio of 1.7. This reaction product contained a mixture of various phenylene linked chloropolysilanes.

*Example 4*

In the manner of Example 2, 1125 g. of the aforesaid crude mixture, 375 g. of methyldichlorosilane, and 15 g. of boron trichloride were heated for 20 hours at 195° C. to 200° C. The reaction product, after removing boron trichloride and unreacted methyldichlorosilane by distillation, had an analysis of 26.23% Cl and 13.68% Si, showing a Cl:Si atomic ratio of about 1.5. The hydrolysis, by conventional methods, of a portion of the combined reaction products from Examples 2, 3, and 4 yielded a resin. A thin film of this resin was tack-free after being heated at 200° C. for 5 hours.

That which is claimed is:

1. The process which comprises reacting an organochlorosilane of the general formula $C_6H_5R_xSiCl_{3-x}$, in which each R represents a monovalent hydrocarbon radical free of aliphatic unsaturation and $x$ is an integer having a value of from 0 to 2 inclusive, with a chlorohydrosilane of the group consisting of methyldichlorosilane and trichlorosilane, in the presence of a boron halide and at a temperature of from 150° C. to 420° C., at least a portion of the reaction mixture being in a liquid phase, whereby phenylene linked chlorosilanes are produced.

2. The process which comprises reacting an organochlorosilane of the general formula $C_6H_5R_xSiCl_{3-x}$, in which each R represents a radical of the group consisting of phenyl and methyl radicals, and $x$ is an integer having a value of from 0 to 2 inclusive, with a chlorohydrosilane of the group consisting of methyldichlorosilane and trichlorosilane, in the presence of a boron halide and at a temperature of from 150° C. to 420° C., at least a portion of the reaction mixture being in a liquid phase, whereby phenylene linked chlorosilanes are produced.

3. The process in accordance with claim 2 in which the chlorohydrosilane is methyldichlorosilane.

4. The process in accordance with claim 2 in which the chlorohydrosilane is trichlorosilane.

5. The process in accordance with claim 2 in which the organochlorosilane is phenyltrichlorosilane.

6. Bis(trichlorosilylphenyl)dichlorosilane, $Cl_3SiC_6H_4 \cdot SiCl_2 \cdot C_6H_4SiCl_3$ 7. The process in accordance with claim 2 in which the boron halide is boron trichloride.

ARTHUR J. BARRY.

No references cited.